US009616961B2

(12) United States Patent
Wright

(10) Patent No.: US 9,616,961 B2
(45) Date of Patent: Apr. 11, 2017

(54) KICK SCOOTER

(71) Applicant: Christian Wright, Melrose, MA (US)

(72) Inventor: Christian Wright, Melrose, MA (US)

( * ) Notice: Subject to any disclaimer, the term of this patent is extended or adjusted under 35 U.S.C. 154(b) by 0 days.

(21) Appl. No.: 14/855,110

(22) Filed: Sep. 15, 2015

(65) Prior Publication Data

US 2017/0073031 A1 Mar. 16, 2017

(51) Int. Cl.

| | |
|---|---|
| ***B62K 5/05*** | (2013.01) |
| ***A61H 3/04*** | (2006.01) |
| ***A61G 5/02*** | (2006.01) |
| ***B62K 3/00*** | (2006.01) |
| ***B62K 19/00*** | (2006.01) |
| ***B62K 21/12*** | (2006.01) |
| *A61H 3/00* | (2006.01) |

(52) U.S. Cl.

CPC ............... *B62K 3/002* (2013.01); *A61H 3/04* (2013.01); *B62K 19/00* (2013.01); *B62K 21/12* (2013.01); *A61H 2003/005* (2013.01)

(58) Field of Classification Search

CPC ................ A61H 2003/005; A61H 3/04; A61H 2201/0192; B62K 5/023; B62K 5/05; A61G 5/02

See application file for complete search history.

(56) References Cited

U.S. PATENT DOCUMENTS

| | | | | |
|---|---|---|---|---|
| 1,668,623 A * | 5/1928 | Avril | B62K 3/002 | 280/87.021 |
| 2,460,815 A * | 2/1949 | Dunkel | B62B 13/04 | 280/28.14 |
| 3,486,765 A * | 12/1969 | Turner | B62K 15/00 | 280/278 |
| 8,827,284 B2 * | 9/2014 | Walther | B62K 5/023 | 280/87.041 |

* cited by examiner

*Primary Examiner* — Bryan Evans

(74) *Attorney, Agent, or Firm* — Coleman & MacDonald Law Office

(57) ABSTRACT

A kick scooter includes a frame having a head tube for supporting handlebars and a front fork, an elongated frame member extending along a length of the frame, the frame member having a first end attached to the head tube and a second end configured for attachment to a rear wheel, the frame member being angularly disposed relative to the head tube. The frame includes support member coupled to the frame member for adjustable movement along a length of the frame member, a knee pad is attached to the support member for supporting a rider's knee and shin. The support member is movable relative to the frame member for adjusting a position of the knee pad relative to the head tube and a riding surface. The kick scooter further includes front and rear wheels, and a handlebar attached to the frame.

14 Claims, 6 Drawing Sheets

KICK SCOOTER

FIELD OF THE INVENTION

The present disclosure relates generally to a kick scooter. More particularly, the disclosure relates to a kick scooter having a frame including a knee pad that is adjustable relative to the frame and handlebars for accommodating riders of various height.

BACKGROUND OF THE INVENTION

The statements in this section merely provide background information related to the present disclosure and may not constitute prior art.

A kick scooter typically has two wheels, handlebars and a platform for a rider to support one or both feet on the platform while riding the kick scooter. Many prior art kick scooters have two small wheels attached at the ends of the platform which typically render the scooter unstable and/or unsafe at higher speeds or on uneven surfaces.

Most prior art kick scooters do not provide a place to support a knee of the rider such that a frame of the scooter can be mounted on larger wheels providing a more stable kick scooter.

Accordingly, it is an object of the present teachings to provide a kick scooter that overcomes the shortcomings of prior art kick scooters.

SUMMARY OF THE INVENTION

This section provides a general summary of the disclosure and does not provide a comprehensive description or include full scope or all the features of the subject matter disclosed.

According to one aspect, the present teachings provide a kick scooter having a frame including a head tube for supporting handlebars and a front fork, an elongated frame member extending along a length of the frame, the frame member having a first end attached to the head tube and a second end configured for attachment to a rear wheel, the frame member being angularly disposed relative to the head tube. The frame includes a support member coupled to the frame member for adjustable movement along a length of the frame member. A knee pad is attached to the support member for supporting a rider's knee and shin. The support member is movable relative to the frame member for adjusting a position of the knee pad relative to the head tube and a riding surface. The kick scooter also included front and rear wheels attached to the frame and a handlebar attached to the frame.

In another aspect, the frame member includes first and second frame members, the first frame member overlying the second frame member, each of the first and second frame members disposed in a central plane defined by the frame, the support member being coupled to the first frame member.

According to another aspect, the present teachings provide a frame and for a kick scooter including a head tube for supporting handlebars and a front fork, and an elongated frame member extending along a length of the frame, the frame member having a first end attached to the head tube and a second end configured for attachment to a rear wheel, the frame member being angularly disposed relative to the head tube. A support member is coupled to the frame member for adjustable movement along a length of the frame member. A knee pad is attached to the support member for supporting a rider's knee and shin; and the support member is movable relative to the frame member for adjusting a position of the knee pad relative to the head tube and a riding surface.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description, the appended claims and the following drawings. The drawings are for illustrative purposes only and are not intended to limit the scope of the present disclosure.

DETAILED DESCRIPTION OF EMBODIMENTS OF THE INVENTION

Figure 1:
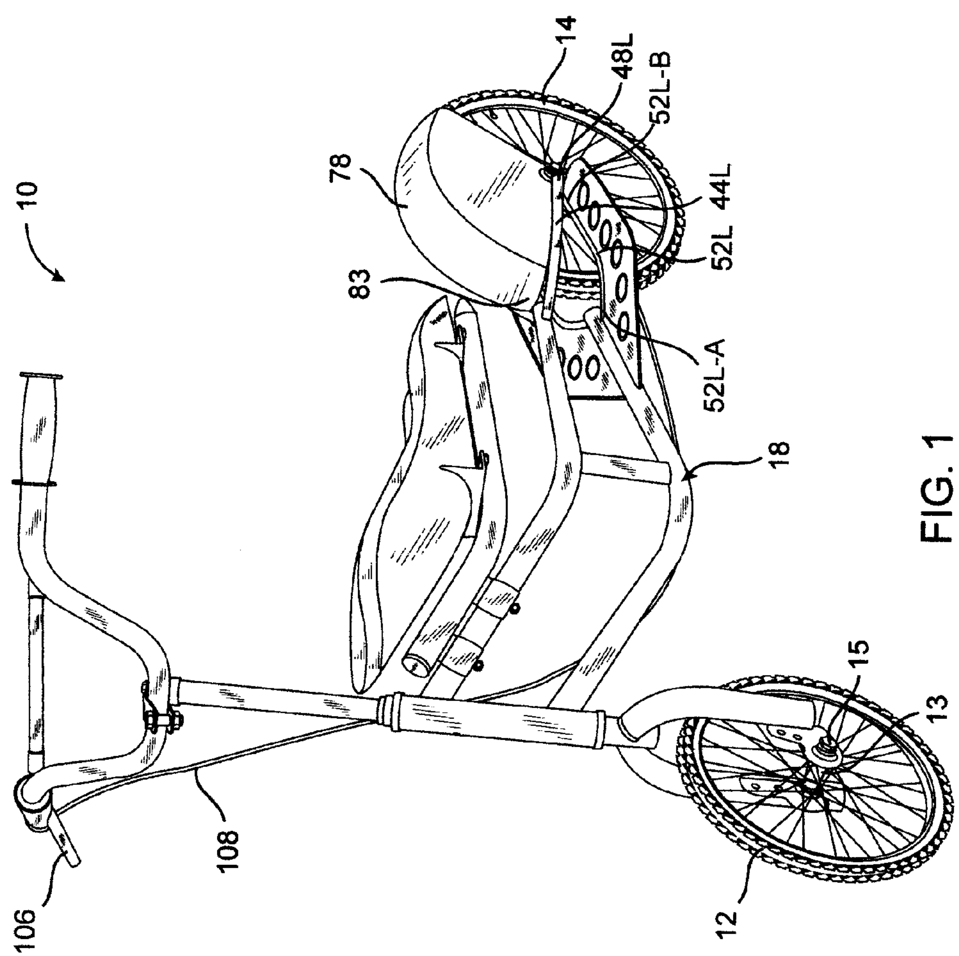
FIG. 1 is a perspective view of one embodiment of a kick scooter in accordance with the present invention.

Detailed illustrative descriptions of example embodiments are disclosed herein. However, specific structural and functional details disclosed herein are merely representative for purposes of describing example embodiments. The example embodiments may be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected," "coupled," "mated," "attached," or "fixed" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the language explicitly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

FIGS. 1-5 show a kick scooter 10 that includes a front wheel 12, a rear wheel 14, and a frame 18. The front and rear wheels 12, 14 support the frame 18 above a riding surface 20. The frame includes a head tube 24, and upper and lower frame members 26, 28, respectively. A knee support 30 is coupled to the upper frame member 26 for supporting a rider.

Figure 4:
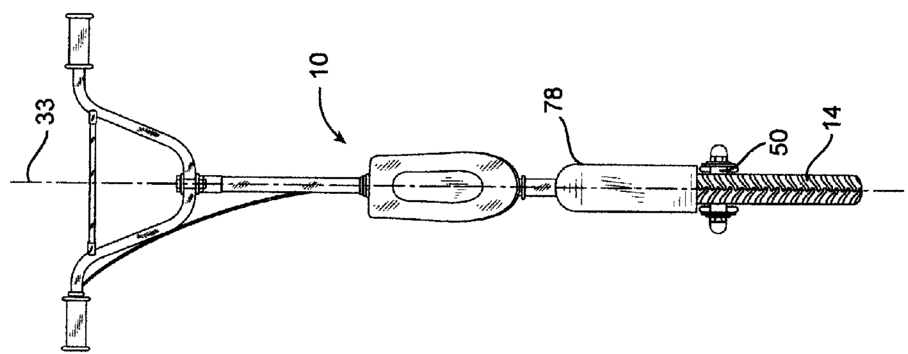
FIG. 4 is a rear elevation view of the kick scooter of FIG. 1.
Figure 3:
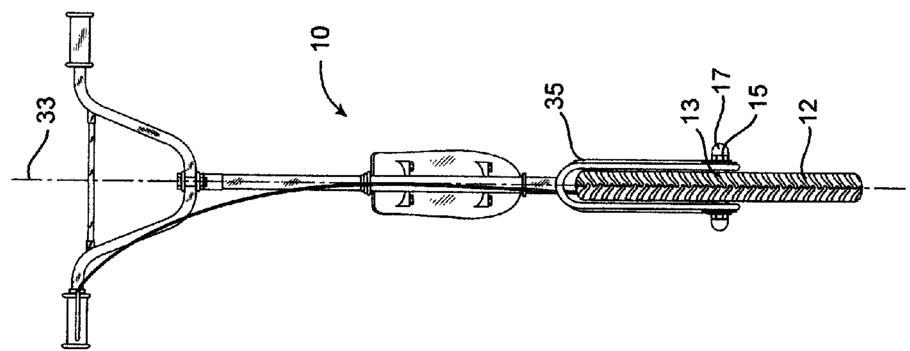
FIG. 3 is a front elevation view of the kick scooter of FIG. 1.

With reference to FIGS. 3 and 4, the kick scooter 10 defines a central plane 33 that extends generally through the center of the frame 18 and front and rear wheels 12, 14 and divides the frame into left and right side portions. The frame 18 can be formed from any suitable material, such as composites, including carbon-fiber composites, aluminum, steel, and the like.

Figure 2:
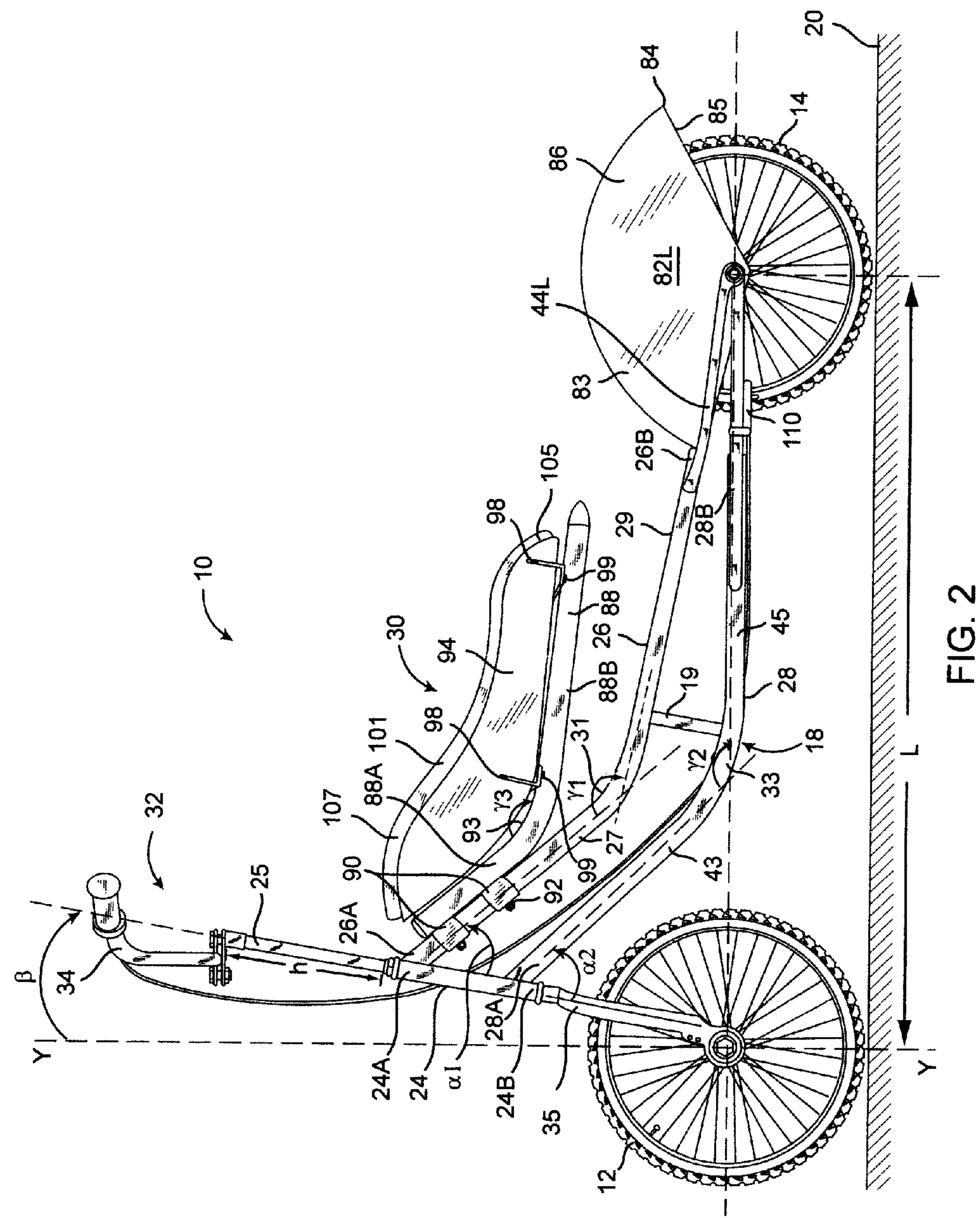
FIG. 2 is left side elevation view of the kick scooter of FIG. 1.
Figure 7:
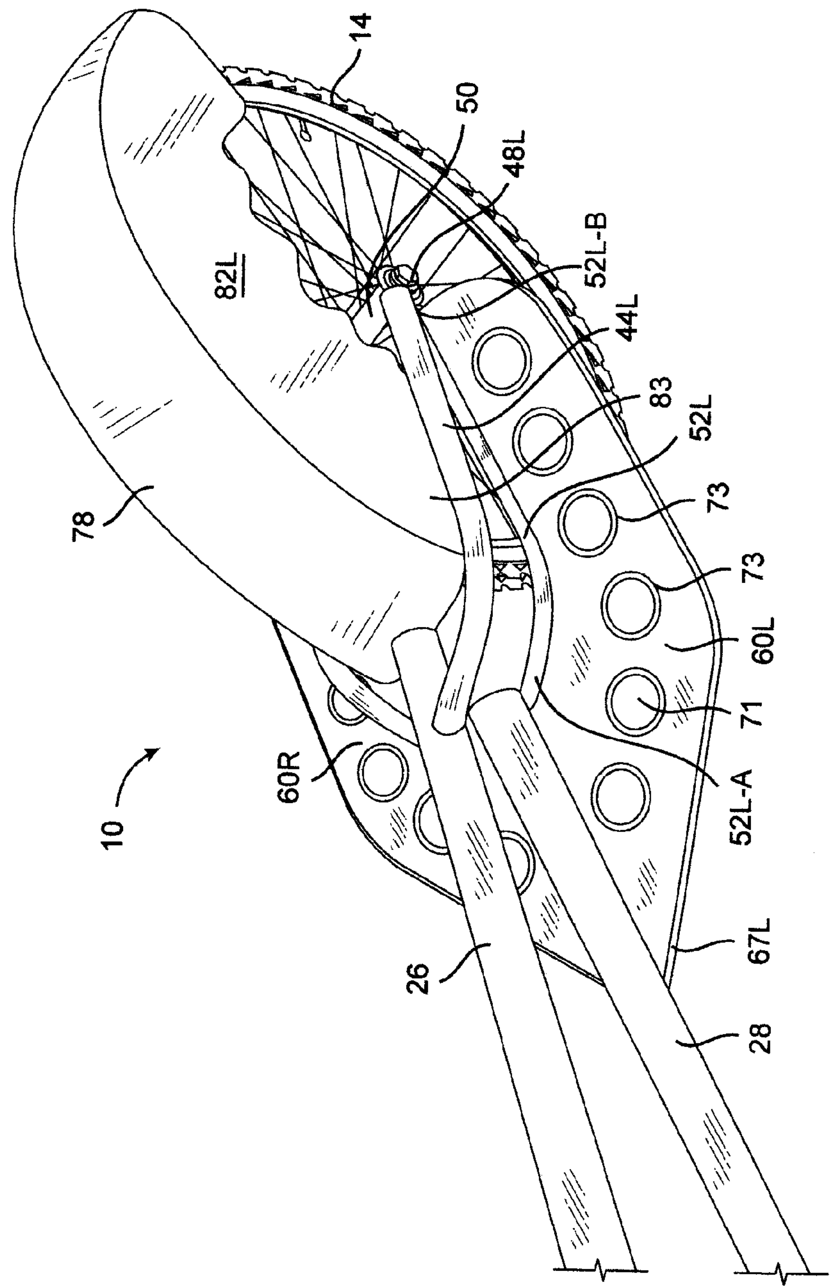
FIG. 7 is partial left side perspective of a rear portion of the kick scooter of FIG. 1.

Referring to FIG. 2 and FIG. 7, The kick scooter 10 further includes a handlebar assembly 32 and front fork 35. The head tube 24 receives an upper portion of the front fork 35. The handlebar assembly 32 includes a gooseneck 25 and handlebars 34 rotatably coupled to the gooseneck 25 as is well known in the art. The gooseneck 25 is attached to the front fork 35 and extends above the head tube 24 a distance/height h. The height h of the gooseneck 25 above the head tube 24 is adjustable for varying a height of the handlebars relative to the head tube 24. In one embodiment the head tube 24 defines a length of about ten inches. In other embodiments, a length of the head tube 24 is in a range of about six inches to about twelve inches.

The front wheel 12 includes a front axle 13 coupled to openings (not shown) defined by the front fork 35 via axle nuts 15 so that the front wheel 12 is rotatably fixed to the front fork in a configuration also well known in the art. As shown in FIG. 3, caps 17 are coupled to the ends of the front axle 13 for protecting the axle end and/or an individual from contacting the axle end. Alternatively a quick release coupler (not shown) may be used to attach the front axle 13 to the front fork 35.

The handlebar assembly 32 is rotatable by the rider via handlebars 34 to rotate the front fork 35 and front wheel 12 for steering the kick scooter 10. As will be understood by one of skill in the art, the head tube 24 typically retains bearings (not shown) to facilitate rotation of the front fork 35 and the handlebar assembly 32 relative to the head tube.

The upper frame member 26 is elongated and extends generally in the central plane 33 of the frame 18. A forward end 26A of the upper frame member 26 is attached to the head tube 24 and extends outwardly therefrom generally along a length L of the kick scooter 10. A rearward end 26B of the upper frame member 26 is coupled to and supports a front end 83 of a rear fender 78. In one embodiment, the upper frame member 26 defines a first bend 31 formed near a midpoint thereof. The upper frame member 26 including a front member portion 27 located between the head tube 24 and the first bend 31 and a rear member portion 29 positioned between the first bend and the rear fender 40. In the FIG. 2 embodiment, the front member portion 27 extends outwardly from the head tube 24 at an angle $\alpha 1$ measuring about fifty degrees; and the head tube 24 being disposed at an angle $\beta$ measured from a vertical axis Y-Y which is generally perpendicular to the riding surface 20. In the FIG. 2 embodiment the angle $\beta$ is about fifteen degrees. In other embodiments, the angle $\alpha 1$ is in a range or about forty degrees to about sixty degrees, and the angle $\beta$ may be in a range of about zero degrees to about twenty degrees.

The first bend 31 defines an angle $\gamma 1$ disposed between longitudinal axes of the front member portion 27 and rear member portion 29 of the upper frame member 26. As shown in FIGS. 2 and 7, the first bend 31 formed in the upper frame member 26 is configured so that the axis of the rear member portion 29 of the upper frame member 26 is at a lesser angle relative to the riding surface 20 than the axis of the front member portion 27 relative to the riding surface. In the FIG. 2 embodiment, the angle $\gamma 1$ measures about 145 degrees. In other embodiments of kick scooter 10, the angle $\gamma 1$ is in a range of about 130 degrees to about 160 degrees.

Referring further to FIG. 2 and FIG. 7, a rear upper fork 44 includes left and right fork legs 44L, 44R respectively, positioned one each on the left and rights sides of central plane 33. Each upper fork leg 44L, 44R having a forward end 44L-A, 44R-A, respectively being coupled to a side of the upper frame member 26 near the rearward end 26B thereof, and a rearward end 44L-B and 44R-B coupled to left and right axle flanges 48L, 48R respectively. The left and right axle flanges 48L, and 48R each define an opening 49 (e.g., a slot) for receiving a rear axle 50 therein. The rear axle 50 rotatably coupling rear wheel 14 to frame 18 via the left and right axle flanges 48L, 48R, as is well known in the art.

Still referring to FIG. 2 and FIG. 7, the lower frame member 28 is elongated and extends generally in the central plane 33 of the frame 18. A forward end 28A of the lower frame member 28 is attached to the head tube 24 and extends outwardly therefrom generally along a length L of the kick scooter 10. A rearward end 28B of the lower frame member 28 terminates forward of the rear wheel 14. In the illustrated embodiment, the lower frame member 28 defines a second bend 33 formed near a midpoint thereof. The lower frame member 28 including a forward portion 43 located between the head tube 24 and the second bend 33 and a rear portion 45 positioned between the second bend and the rear wheel 14 and terminating at the rearward end 28B thereof. In the FIG. 2 embodiment, the front portion 43 extends outwardly from the head tube 24 at an angle $\alpha 2$ measuring about 52 degrees. In other embodiments, the angle $\alpha 2$ is in a range or about 40 degrees to about 60 degrees. As shown in the FIG. 2 embodiment, the rear portion 45 of the lower frame member 18 is disposed generally parallel to the riding surface 20 and approximately perpendicular to each of the front axle 13 and rear axle 50. In the FIG. 2 embodiment, the second bend 33 defines and angle $\gamma 2$ measuring approximately 133 degrees. In other embodiments the angle $\gamma 2$ may be in a range of about 110 degrees to about 150 degrees.

The frame 18 further includes a frame support 19 disposed between the upper and lower frame members 26, 28 and having first and second ends of the frame support 19 fixedly attached to the upper and lower frame members respectively. The first end of the frame support 19 being attached to a lower side of the upper frame member 26 and the second end of the frame support 19 being attached to an upper side of the lower frame member 28. In the FIG. 2 embodiment, the frame support 19 is coupled to the upper and lower frame members 26, 28 around a midpoint of each of the frame members and slightly rearward thereof. In other embodiments, the frame 18 may include one or more frame supports attached between the upper and lower frame members 26, 28 along the length of the frame members for strengthening the frame and maintaining the upper and lower frame members spaced apart and in a fixed position.

Figure 5:
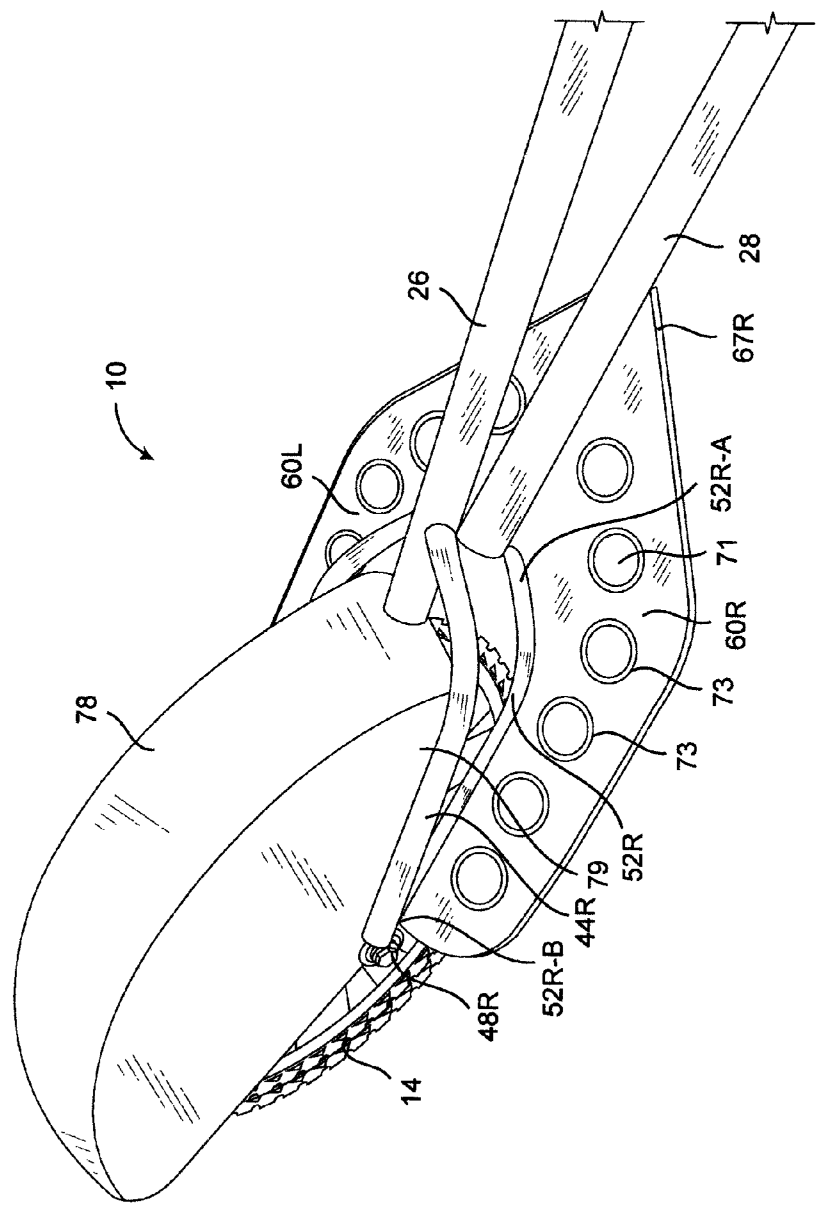
FIG. 5 is a partial right side perspective view of a rear portion of the kick scooter of FIG. 1.

Referring to FIGS. 1 and 5, a rear lower fork 52 includes left and right lower fork legs 52L, 52R respectively, positioned one each on the left and rights sides of central plane 33. Each lower fork leg 52L, 52R having a forward end 52L-A, 52R-A, respectively being coupled to a side of the lower frame member 28 near the rearward end 28B thereof, and a rearward end 52L-B and 52R-B coupled to the left and right axle flanges 48L, 48R respectively. The left and right lower forks configured to support the rearward end 28B of the lower frame member 28. Each of the left and right lower fork legs 52L, 52R defining a bend so that a rearward portion of the lower fork legs are spaced apart for receiving the rear wheel 14 therebetween.

Still referring to FIGS. 1 and 5, right and left footrests 60R and 60L, respectively are provided for a user to rest a foot on while riding on the kick scooter 10. Footrests 60R, 60L includes platforms 62R, 62L respectively, each platform defining a planar surface 63 for supporting a user's foot thereon. The platforms 62R, 62L having an inside edge 65R, 65L extending along a corresponding one of the lower fork legs 52L, 52R. Thus, the right footrest 60R defines an inside edge 65R extending adjacent to and attached an outer surface of the lower fork leg 52R throughout a length of platform 62R. Similarly, the left footrest 60L defines an inside edge 65L of platform 62L that extends adjacent to and is fixedly attached to an outer surface of the lower fork leg 52L throughout a length thereof. In other embodiments of the kick scooter 10, the footrests 60R, 60L may be attached to the frame at the each end thereof. Each of the footrests 60R, 60L have an outside rib 67R, 67L extending along an outside edge 68R, 68L of the platforms 62R, 62L. The outside ribs 67R, 67L being attached to an outside edge 68R, 68L of each of the platforms 62R, 62L respectively. The outside ribs 67R, 67L being elongated and disposed generally parallel to the corresponding lower fork legs 52R and 52L respectively. Each of the outer ribs 67R, 67L having a first end attached to an outer surface of the lower frame member 28 and a second end attached to the corresponding axle flange 48R, 48L respectively. The outer ribs 67R, 67L being generally parallel to the corresponding lower fork legs 52R, 52L and spaced apart therefrom. The platforms 62R, 62L being attached between and supported by the lower fork legs 52 on the inside edge 65R, 65L and by the outside rib 67R, 67L at the outer edge 68R, 67L thereof, respectively. In the illustrated embodiment, the platforms 62R, 62L define a plurality of holes 71 therethrough, the holes 71 extending in a row along a length of the platforms 62R, 62L. The holes 71 defining perimeter flanges 73 extending generally perpendicular to the platforms 62R, 62L for strengthening the platforms. The holes 71 also reduce the weight of the footrests 60R, 60L and the frame 18 generally. Accordingly, the footrests 60R, 60L and platforms 62R, 62L provide a foot support on either side of frame 18 for supporting a foot of a rider's propelling leg during a coasting movement of the kick scooter 10. The width of the platforms 62R, 62L being sized to accommodate a width of a rider's shoe for comfortably supporting the rider's foot thereon. A width of the platforms 62R, 62L is approximately 3.5 inches in the illustrated embodiment, however, in other embodiments a width of the platforms may be in a range of about 2 inches to about 6 inches. As shown in FIG. 5, a width of the platforms 62R, 62L is wider at a forward portion of the platforms that is angularly disposed relative to the central plane 33 of frame 18 than a rearward portion of the platforms disposed parallel to the central plane. As shown in FIG. 5, a length of the platforms 62R, 62L extends along a length of the frame approximately sixteen inches for accommodating a foot of the user in various positions relative to the frame 18 while riding the kick scooter. In one embodiment, a length of the platforms 62R, 62L is about 16 inches in length and sufficient to support an entire shoe of an average user. Typically, however, a user may use the platforms 62R, 62L to support only a front portion of his/her foot on the footrest 60R, 60L, and the extra length of the platforms 62R, 62L provide for comfortable placement of a user's foot thereon relative to the frame 18. In other embodiments, the footrests 60R, 60L may define an overall length in a range of about twelve inches to about twenty inches depending on the size of the frame 18 and the configuration of the platforms 62R, 62L.

Referring now to FIGS. 2, and 7, a fender 78 is attached to the frame 18 for covering the rear wheel 14. The fender defines a front edge 79 extending throughout an entire front opening and defining in part a forward portion 83 of the fender. The forward portion 83 of the fender 78 positioned forward of the rear axle 50 and towards the handlebars 34. In one embodiment, the front edge 79 is coupled to and supported by the upper fork legs 44R and 44L on the left and right sides of the fender respectively. In another embodiment, the fender 78 is positioned adjacent an inside surface of the upper fork legs 44R and 44L and supported by the rear axle 50. A center portion 80 of the front edge 79 is attached to and supported by the rear end 26B of the upper frame member 26. The fender 78 includes opposing right and left sidewalls identified as 82R and 82L, respectively. In the illustrated embodiment, the sidewalls 82R, 82L extend through about 138 degrees of the circumference of the rear wheel 14 beginning with the front edge 79 located adjacent the rear upper fork 44. The fender 78 is designed to protect a rider's feet, shoes, pants, or other body parts or clothing from contacting the rear wheel 14 or rim 38 while riding the kick scooter 10. In other embodiments of kick scooter 10, the fender 78 may be omitted, or configured to cover a lesser portion of the rear wheel 14. The fender 78 defines a rearward edge 84 which extends throughout an entire rear opening 85 of the fender. The rear opening 85 of the fender being defined between the sidewalls 82R, 82L and configured to receive the wheel 14 therein. The sidewalls 82R, 82L each have a center hub 86R, 86L (not shown) which define an opening for receiving the rear axle 50 therethrough.

Figure 6:
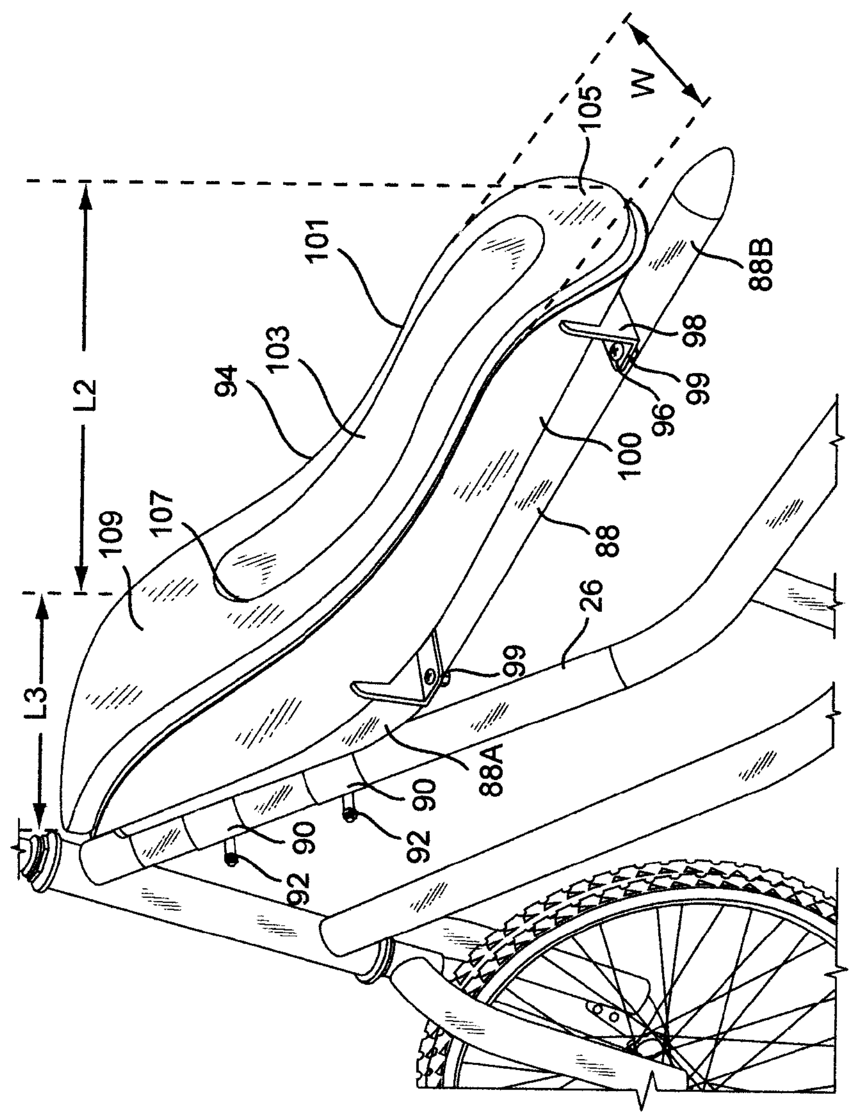
FIG. 6 is a partial perspective view of the frame of the kick scooter of FIG. 1.

As shown in FIGS. 1 and 2, and 6 the frame 18 includes a knee support 30 for supporting a person's knee and shin while riding the kick scooter. The knee support 30 includes a support member 88 that is elongated and movably coupled to the upper frame member 26. The support member 88 is mounted above the upper frame member 26 and defines a longitudinal center aligned with the upper frame member and the central plane 33. The support member 88 defines a forward portion 88A and a rearward portion 88B which are separated by a bend 93. The bend 93 defines an angle $\gamma\mathbf{3}$ of about 130 degrees. In other embodiments, the bend 93 may define an angle $\gamma\mathbf{3}$ in a range between about 100 degrees to about 140 degrees. In the illustrated embodiment, the support member 88 is slidably mounted to the upper frame member 26 via a pair of clamps 90 which are attached to an under side of the forward portion 88A of the support member and encircle the upper frame member 26 for slideable adjustment relative thereto. The clamps 90 include fasteners 92 (e.g., bolts and nuts) for fixing the position of the support member 88 relative to the upper frame member 26. A knee pad 94 is mounted to the support member 88 via brackets 96. In the illustrated embodiment, the brackets 96 each include a pair of mating bracket members 98, 99 mounted one each to a lower surface of the knee pad 94 and an upper surface of the support member 88 respectively. The bracket members 98 mounted to the knee pad extend transversely relative to a length of the knee pad 94 and a length of the frame 18. Similarly, the bracket members 99 mounted to the support member 88 extend transversely relative to a length of the support member. In the illustrated embodiment the mating bracket members 98, 99 align one with the other and are attached together for mounting the knee pad 94 to support member 88. In one embodiment, the mounting brackets 98, 99 define openings (e.g. slots, holes) therethrough (not shown) for receiving fasteners for attaching the bracket members 98 and 99 one to the other.

As shown in FIG. 2, the support member 88 is adjustably movable along a length of the front member portion 27 of the upper frame member 26. As shown in FIG. 2, a slideable adjustment of the support member 88 along the upper frame member 26 moves the knee pad 94 toward and away from the head tube 24 as well as toward and away from the riding surface 20. Thus, the knee pad 94 is adjustable heightwise relative to the riding surface 20 and lengthwise relative to the handlebars 34 by moving the support member 88 forward and back along the upper frame member 26. Once a comfortable position of the knee pad 94 relative to the frame 18 and handlebars 34, the position of the knee pad 94 and support member 88 is fixed via the clamps 90. In one embodiment, the fasteners 92 include quick release fasteners for allowing an adjustment of the knee pad 94 relative to the frame without a need for tools.

In another embodiment (not shown) the bracket members 98, 99 may be configured for adjusting the lengthwise position of the knee pad 94 relative to the support member 88 towards and away from the handlebars 34 for further adjustment of the knee pad 94 lengthwise relative to the frame 18.

As shown in FIGS. 1-3, and 6, the knee pad 94 includes a generally rigid base 100 underlying a resilient pad 101. The rigid base 100 having a generally curved cross section transverse to the length of the frame 18 for receiving the resilient pad 101 therein. The resilient pad 101 defining an elongated opening 103 for receiving a person's knee and shin therein (not shown). The opening 103 extends a length L2 (approx. 12 inches) along the base and generally parallel to the length L of frame 18. The length L2 of the opening 103 being sufficient to receive a rider's entire knee and at least about one-half a length of the rider's shin. In other embodiments, depending on the size of kick scooter 10, the length L2 may be between about 8 inches and 16 inches. In one embodiment, the resilient pad 101 defines a flat portion at the rearward end 105 thereof so that a rider's shin can comfortably extend past the rearward end of the resilient pad. As shown in the FIG. 3 embodiment, the resilient pad 101 includes a forward wall 107 extending generally perpendicular to the length L of the frame for supporting an upper portion of the rider's knee and lower portion of the rider's femur. A forward support portion 109 of the resilient pad being forward of the opening 103 and defining the wall 107 a rearward end thereof. The forward support portion 109 having a length 13 (See FIG. 6) which is approximately equal to about eight inches in the illustrated embodiment. In other embodiments, the length L3 of the forward support portion can between about 6 inches and about 10 inches. A width W (See FIG. 6) of the resilient pad 101 and the forward support portion 109 thereof is about 5.75 inches in the illustrated embodiment. The width W of the resilient pad including a width of the opening 103 as well as left and right side pads extending along each side of the opening 103. In other embodiments, depending on the size of the kick scooter 10, a width W of the resilient pad 101 may be in a range between about 4 inches and about 8 inches.

In the FIG. 2 embodiment, a length L of the kick scooter 10 is measured between front axle 13 and a rear axle 50 (see FIG. 7). In the illustrated embodiment, the length L of frame 18 is about 41 inches and the front and rear wheels are approximately 12 inches in diameter. An overall width of the handlebars 34 is about 22 inches. In other embodiments, the length L of frame 18 may be in a range between about 30 inches and about 48 inches. Similarly, in other embodiments the kick scooter 10 may have front and rear wheels 12, 14 having a diameter in a range of about six inches to about twenty-six inches. In the illustrated embodiment the front and rear wheels 12, 14 are air filled rubber tires mounted on rims 38 made of metal. In other embodiments, the wheels 12, 15 may be solid tires made from rubber, plastic, and/or other suitable materials.

Referring again to FIG. 1, a brake mechanism 110 is attached to the lower frame member 28 near the rear end 28B thereof. The brake mechanism is operable by a rider of the kick scooter 10 via a hand brake lever 106 attached to the handlebars 34 and brake cable 108.

In use, a rider grasps the handlebars 34 and places one knee and shin on knee support 30. The position of the knee support 30 relative to the handlebars 34 and a riding surface 20 may be adjusted by loosening the fasteners 92 securing clamps 90 and moving the knee support relative to the frame 18 either toward or away from the head tube 24. The angularly disposed upper frame member 26 allows the knee support to be adjusted along the upper frame member 26 so that a rider can comfortably support one knee on the knee support and swing his/her other leg from the hip. The rider can then start the kick scooter 10 in motion by propelling the kick scooter with his/her foot and leg opposite the one supported by knee support 30. A proper positioning of the knee support 30 relative to the handlebars 34 and riding surface 20 allows a rider to propel the kick scooter 10 with powerful and swift propelling thrusts via the rider's leg and foot off the riding surface so that the kick scooter 10 can be propelled along the riding surface 20 at a very fair speed.

The larger wheels 12, 15 on the kick scooter 10 compared to many prior art kick scooters renders the kick scooter 10 more stable to ride and capable of faster speeds in a safe manner. For example, the kick scooter 10 can be safely operated at speeds of five to eight miles per hour and potentially greater speeds are obtainable going downhill on the kick scooter.

Example embodiments and methods thus being described, it will be appreciated by one skilled in the art that example embodiments may be varied through routine experimentation and without further inventive activity. Variations are not to be regarded as departure from the spirit and scope of the exemplary embodiments, and all such modifications as would be obvious to one skilled in the art are intended to be included within the scope of the following claims.

What is claimed is:

1. A frame for a kick scooter comprising:

a head tube for supporting handlebars and a front fork;

an elongated frame member extending along a length of the frame, the frame member having a first end attached to the head tube and a second end configured for attachment to a rear wheel, the frame member being angularly disposed relative to the head tube;

a support member coupled to the frame member for adjustable movement along a length of the frame member, the support member being coupled to the frame member via a pair of clamps, the clamps being attached to the support member and configured to encircle the frame member for coupling the support member to the frame member, the support member being slidable relative to the frame member via the clamps;

a knee pad attached to the support member for supporting a rider's knee and shin; and wherein the support member being movable relative to the frame member for adjusting a position of the knee pad relative to the head tube and a riding surface.

2. The frame according to claim 1 wherein the frame member comprises first and second frame members, the first frame member overlying the second frame members, each of the first and second frame members disposed in a central plane of the frame, the support member being coupled to the first frame member.

3. The frame according to claim 2 further comprising left and right footrests coupled to the frame one each on left and right sides of the central plane and between a midpoint of a length of the frame and a rear axle coupled to the frame.

4. The frame according to claim 2 further comprising left and right footrests coupled to the second frame member, each of the footrests defining a platform disposed generally perpendicular to the central plane.

5. The frame according to claim 1 wherein the support member defines a forward portion, a rearward portion and a bend therebetween, the forward portion being coupled to the frame.

6. The frame according to claim 1 wherein the frame member includes a front portion and a rear portion and defines a first bend between the front portion and the rear portion, the first bend defining an angle in a range between about 130 degrees to about 150 degrees.

7. The frame according to claim 6 wherein the first bend between the front and rear portions of the frame member defines an angle in a range between about 138 degrees and 142 degrees.

8. A kick scooter comprising:

a frame including:

a head tube for supporting handlebars and a front fork;

an elongated frame member extending along a length of the frame, the frame member having a first end attached to the head tube and a second end configured for attachment to a rear wheel, the frame member being angularly disposed relative to the head tube;

a support member coupled to the frame member for adjustable movement along a length of the frame member, the support member being coupled to the frame member via a pair of clamps, the clamps being attached to the support member and configured to encircle the frame member for coupling the support member to the frame member, the support member being slidable relative to the frame member via the clamps;

a knee pad attached to the support member for supporting a rider's knee and shin;

the support member being movable relative to the frame member for adjusting a position of the knee pad relative to the head tube and a riding surface;

front and rear wheels attached to the frame; and a handlebar attached to the frame.

9. The kick scooter according to claim 8 wherein the frame member comprises first and second frame members, the first frame member overlying the second frame members, each of the first and second frame members disposed in a central plane of the frame, the support member being coupled to the first frame member.

10. The kick scooter according to claim 9 further comprising left and right footrests coupled to the frame one each on left and right sides of the central plane and between a midpoint of a length of the frame and a rear axle coupled to the frame.

11. The kick scooter according to claim 9 further comprising left and right footrests coupled to the second frame member, each of the footrests defining a platform disposed generally perpendicular to the central plane.

12. The kick scooter according to claim 8 wherein the support member defines a forward portion, a rearward portion and a second bend between the forward portion and the rearward portion, the forward portion being coupled to the frame.

13. The kick scooter according to claim 8 wherein the frame member includes a front portion and a rear portion and defines a first bend between the front portion and the rear portion, the first bend defining an angle in a range between about 130 degrees to about 150 degrees.

14. The kick scooter according to claim 13 wherein the first bend between the front and rear portions of the frame member defines an angle in a range between about 138 degrees and 142 degrees.

* * * * *